US006688719B2

(12) United States Patent
Silverbrook et al.

(10) Patent No.: US 6,688,719 B2
(45) Date of Patent: Feb. 10, 2004

(54) THERMOELASTIC INKJET ACTUATOR WITH HEAT CONDUCTIVE PATHWAYS

(75) Inventors: Kia Silverbrook, Balmain (AU); Gregory John McAvoy, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 13 days.

(21) Appl. No.: 10/120,359

(22) Filed: Apr. 12, 2002

(65) Prior Publication Data

US 2003/0193538 A1 Oct. 16, 2003

(51) Int. Cl.$^{7}$ .......................... B41J 29/36; B41J 29/377; B21D 53/76; B23P 17/00

(52) U.S. Cl. ........................... 347/18; 347/17; 29/890.1

(58) Field of Search .............................. 347/17, 18, 54; 29/890.1

(56) References Cited

U.S. PATENT DOCUMENTS 5,936,646 A * 8/1999 Kenny et al. ................. 347/18
6,065,823 A * 5/2000 Kawamura ................... 347/18
6,213,589 B1 * 4/2001 Silverbrook ................. 347/54

FOREIGN PATENT DOCUMENTS

| | | |
|---|---|---|
| EP | 0 816 083 A2 | 1/1998 |
| GB | 2 334 000 A | 8/1999 |
| JP | 08309980 A | 11/1996 |

* cited by examiner

*Primary Examiner*—Stephen D. Meier
*Assistant Examiner*—Craig Hallacher

(57) ABSTRACT

A thermal inkjet actuator for use in an inkjet printer assembly includes heat conduction means arranged to realize a predetermined negative pressure profile to facilitate droplet formation. In a preferred embodiment the heat conduction means comprises a thin layer of very high thermally conductive material such as Aluminum located in the middle of a non-heat conductive passive bend layer. The overall cool-down speed of the actuator, and hence the speed with which the passive bend layer returns to its quiescent position can be controlled by controlling the proximity of the heat conductive layer to the actuator's heater during fabrication.

3 Claims, 5 Drawing Sheets

THERMOELASTIC INKJET ACTUATOR WITH HEAT CONDUCTIVE PATHWAYS

BACKGROUND OF THE INVENTION

1. Field of the Invention

The present invention relates to the field of inkjet printing and, in particular, discloses an improved thermoelastic inkjet actuator.

2. Description of Related Art

Thermoelastic actutator inkjet nozzle arrangements are described in U.S. patent applications Nos. U.S. Ser. No. 09/798,757 and U.S. Ser. No. 09/425,195 which are both co-owned by the present applicant and herein incorporated by cross reference in their entireties.

A first nozzle according to an embodiment of the invention described in that document is depicted in FIG. 1. FIG. 1 illustrates a side perspective view of the nozzle arrangement and FIG. 2 is an exploded perspective view of the nozzle arrangement of FIG. 1. The single nozzle arrangement 1 includes two arms 4, 5 which operate in air and are constructed from a thin 0.3 micrometer layer of titanium diboride 6 on top of a much thicker 5.8 micron layer of glass 7. The two arms 4, 5 are joined together and pivot around a point 9 which is a thin membrane forming an enclosure which in turn forms part of the nozzle chamber 10. The arms 4 and 5 are affixed by posts 11, 12 to lower aluminium conductive layers 14, 15 which can form part of the CMOS layer 3. The outer surfaces of the nozzle chamber 18 can be formed from glass or nitride and provide an enclosure to be filled with ink. The outer chamber 18 includes a number of etchant holes e.g. 19 which are provided for the rapid sacrificial etchant of internal cavities during construction by MEM processing techniques.

The paddle surface 24 is bent downwards as a result of the release of the structure during fabrication. A current is passed through the titanium boride layer 6 to cause heating of this layer along arms 4 and 5. The heating generally expands the T1B2 layer of arms 4 and 5 which have a high Young's modulus. This expansion acts to bend the arms generally downwards, which are in turn pivoted around the membrane 9. The pivoting results in a rapid upward movement of the paddle surface 24. The upward movement of the paddle surface 24 causes the ejection of ink from the nozzle chamber 21. The increase in pressure is insufficient to overcome the surface tension characteristics of the smaller etchant holes 19 with the result being that ink is ejected from the nozzle chamber hole 21.

As noted previously the thin titanium diboride strip 6 has a sufficiently high young's modulus so as to cause the glass layer 7 to be bent upon heating of the titanium diboride layer 6. Hence, the operation of the inkjet device is as illustrated in FIGS. 3–5. In its quiescent state, the inkjet nozzle is as illustrated in FIG. 3, generally in the bent down position with the ink meniscus 30 forming a slight bulge and the paddle being pivoted around the membrane wall 9. The hearing of the titanium diboride layer 6 causes it to expand. Subsequently, it is bent by the glass layer 7 so as to cause the pivoting of the paddle 24 around the membrane wall 9 as indicated in FIG. 4. This causes the rapid expansion of the meniscus 30 resulting in a positive pressure pulse and the general ejection of ink from the nozzle chamber 10. Next the current to the titanium diboride is switched off and the paddle 24 returns to its quiescent state resulting in a negative pressure pulse causing a general sucking back of ink via the meniscus 30 which in turn results in the ejection of a drop 31 on demand from the nozzle chamber 10.

By shaping the electrical heating pulse the magnitude and time constants of the positive pressure pulse of the thermoelastic actuator may be controlled. However, the negative pressure pulse remains uncontrolled. The characteristics of the negative pressure pulse becomes more influential for fluids of high viscosity and high surface. Accordingly it would be desirable if theromelastic inkjet nozzles with tailored negative pressure pulse characteristics were available.

A further difficulty with some types of thermoelastic actuators is that it is not unusual for very high temperature actuators to induce temperatures above the boiling point of any given liquid on the bottom surface of the non-conductive layer.

It is an object of the present invention to provide a thermoelastic actuator with a tailored negative pressure pulse characteristic.

BRIEF SUMMARY OF THE INVENTION

According to a first aspect of the present invention there is provided a thermoelastic actuator assembly including:

a heat conduction means positioned to conduct heat generated by a heating element away from said actuator assembly thereby facilitating the return of the actuator to a quiescent state subsequent to operation.

Preferably the heating element comprises a heating layer which is bonded to a passive bend layer wherein the heat conduction means is located within the passive bend layer.

The heat conduction means may comprise one or more layers of a metallic heat conductive material located within the passive bend layer.

Preferably the one or more layers of metallic heat conductive material is sufficient to prevent overheating of ink in contact with said actuator.

Typically the one or more layers of metallic heat conductive material comprise a laminate of heat conductive material, for example Aluminium, and passive bend layer substrate.

It is envisaged that the thermoelastic actuator be incorporated into an ink jet printer.

A method of producing a thermoelastic actuator assembly having desired operating characteristics including the steps of:

determining a desired negative pressure pulse characteristic for the actuator;

determining a heat dissipation profile corresponding to the desired negative pressure pulse characteristic; and forming the thermoelastic actuator with a heat conduction means arranged to realize said profile.

Preferably the step of determining a desired negative pressure pulse characteristic includes a step of determining the physical qualities of a fluid to be used with the thermoelastic actuator.

The step of forming the thermoelastic actuator with a heat conduction means arranged to realize said profile may include forming one or more heat conductive layers in a passive bend layer of the actuator.

DETAILED DESCRIPTION OF THE PREFERRED EMBODIMENT

Figure 1:
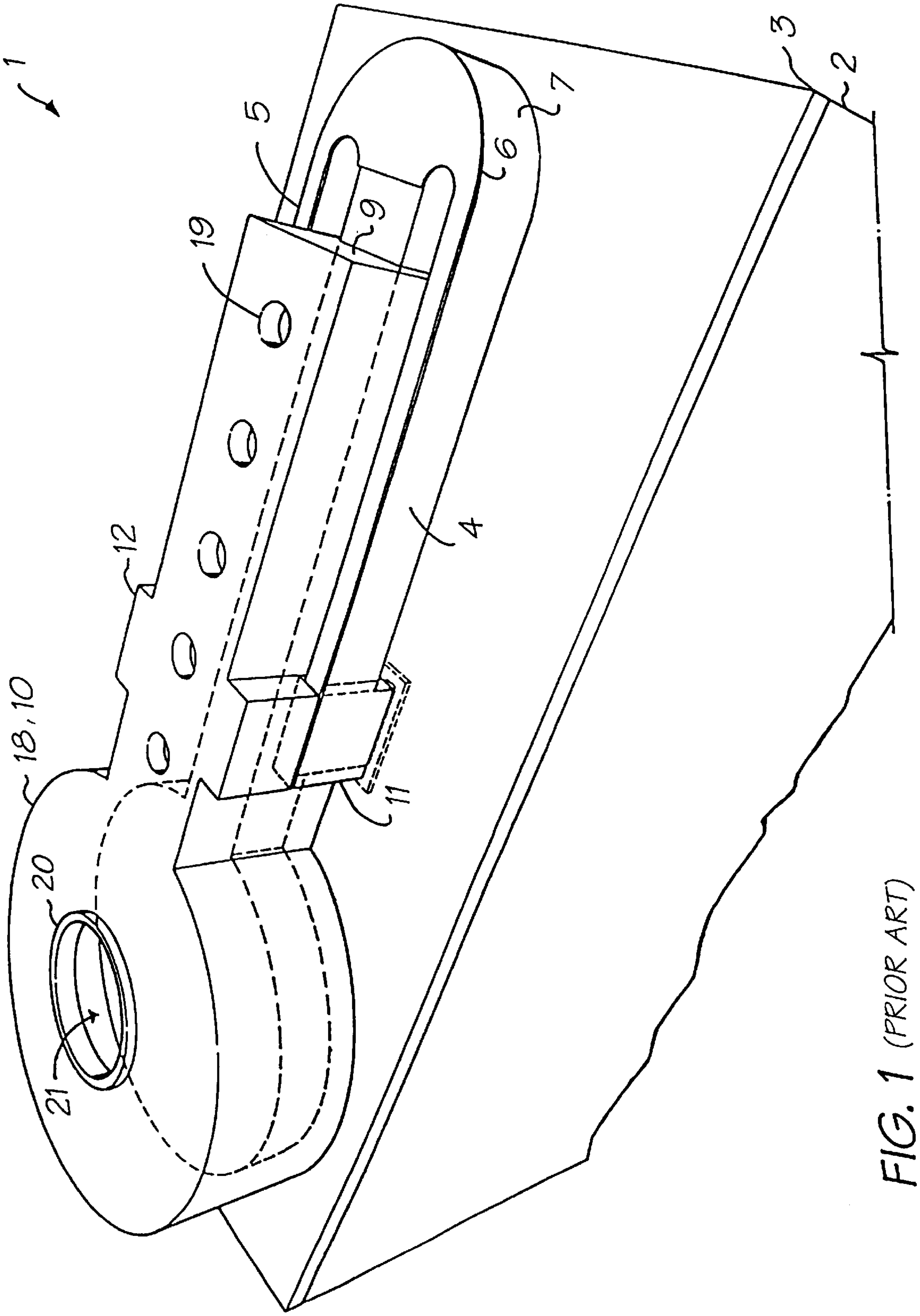
FIG. 1 (PRIOR ART)
FIG. 1 is a perspective view of a prior art thermoelastic actuator.
Figure 2:
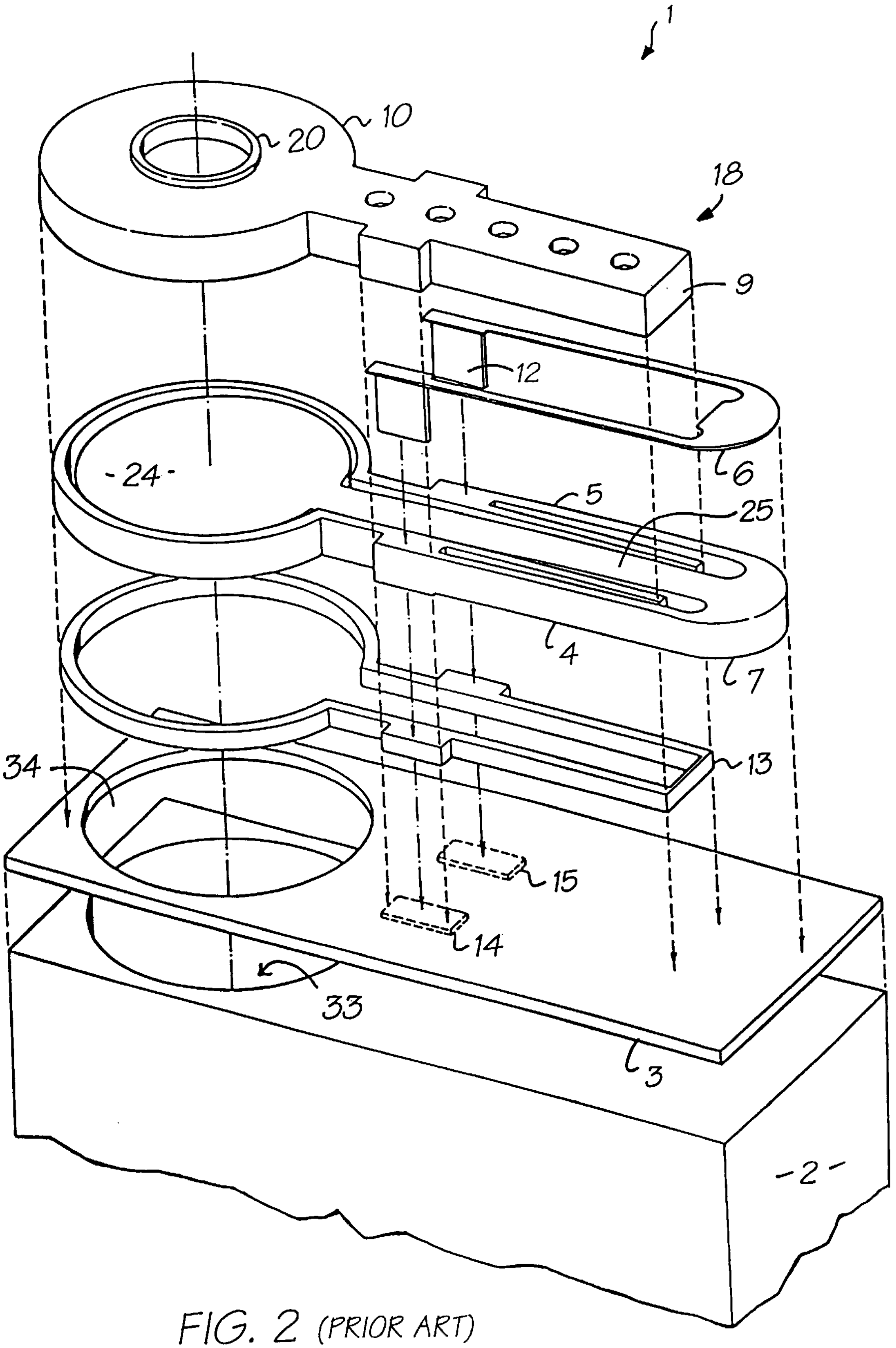
FIG. 2 (PRIOR ART)
FIG. 2 is an exploded view of the thermoelastic actuator of FIG. 1.
Figure 3:
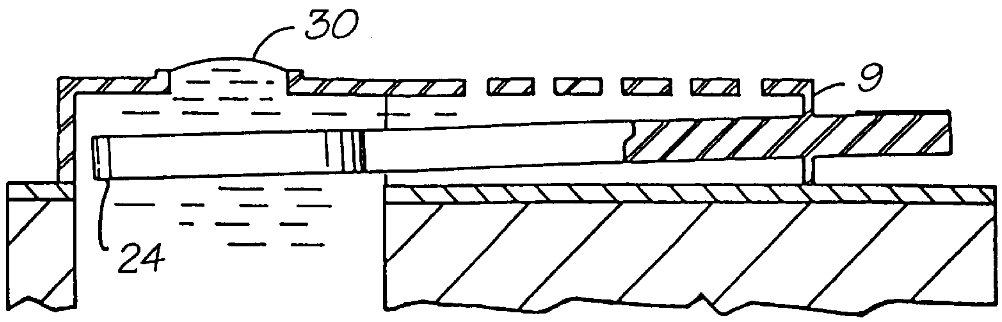
FIG. 3 (PRIOR ART)
FIG. 3 is a cross sectional view of the thermoelastic actuator of FIG. 1 during a first operational phase.
Figure 4:
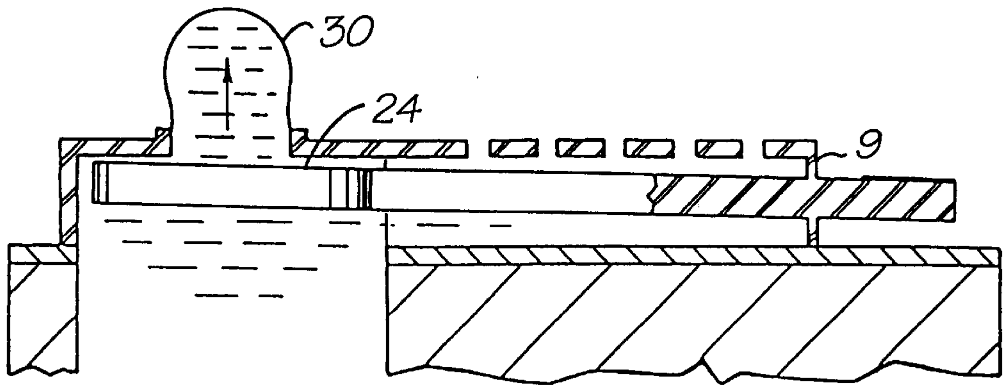
FIG. 4 (PRIOR ART)
FIG. 4 is a cross section view of the thermoelastic actuator of FIG. 1 during a second operational phase.
Figure 5:
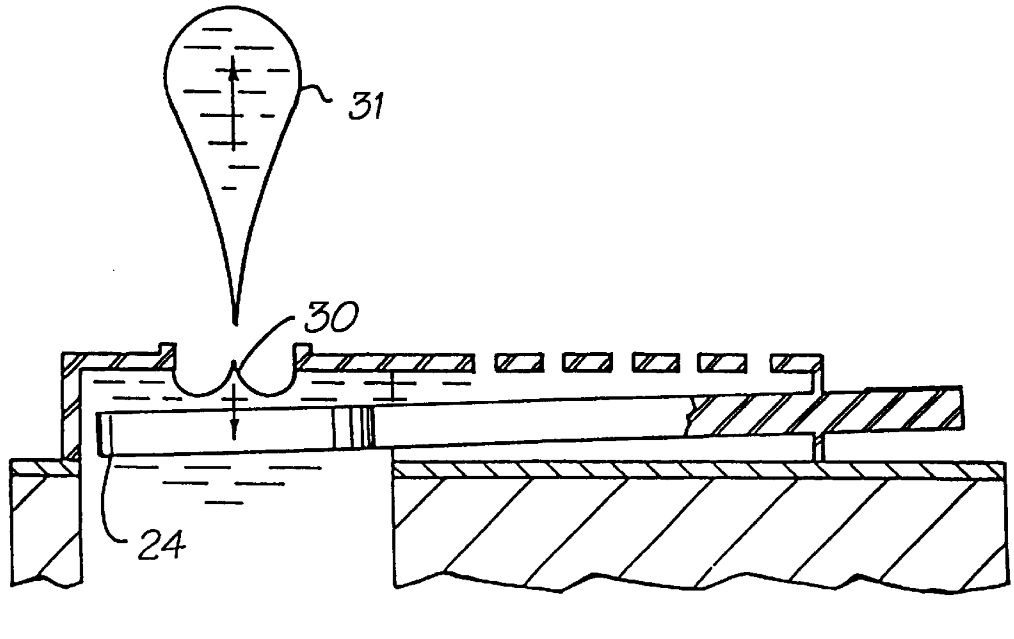
FIG. 5 (PRIOR ART)
FIG. 5 is a cross sectional view of the thermoelastic actuator of FIG. 1 during a further operational phase.
Figure 6:
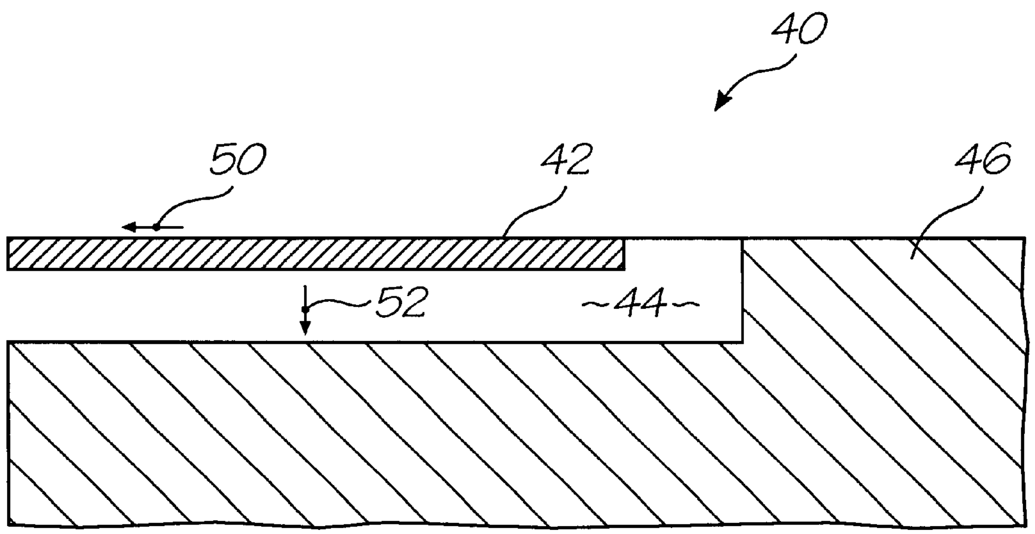
FIG. 6 (PRIOR ART)
FIG. 6 is a cross sectional view of a portion of a prior art thermoelastic actuator assembly.

Referring to FIG. 6, there is depicted a simplified side profile of a portion of a prior art thermoelastic actuator 40. Actuator 40 includes a heating element in the form of a heater layer 42 and a passive bend layer 44. Typically the passive bend layer comprises an insulator of low thermal conductivity such as Silicon Dioxide. A fluid such as ink fills reservoir 46. The direction of heat flow from heater layer 42 is indicated by arrows 50 and 52.

A preferred embodiment of a thermoelastic actuator according to the present invention will now be described with reference to FIG. 7. The actuator includes a thin layer 54 of very high thermally conductive material, such as Aluminium located in the middle of the non-heat conductive passive bend layer 56. Thus as heat energy is conducted away from the heater layer it ultimately encounters the conductive layer and is conducted away as indicated by arrows 58. The heat is conducted away from the actuator by heat conductive layer 54 to the large relatively cold thermal mass of the supporting structure (not shown) as opposed to further conduction through the thickness of the actuator itself.

The overall cool-down speed of the actuator, and hence the speed with which the passive bend layer returns to its quiescent position, and so the shape of the negative pressure pulse, can be controlled by the proximity of heat conductive layer 54 to heater layer 58. Locating the heat conductive layer closer to the heater layer results in an actuator that cools down more quickly.

The heat conductive layer may be positioned to prevent the bottom surface of the bonded actuator from getting excessively hot, thus the actuator can be in direct contact with any given fluid without causing boiling or overheating.

Figure 8:
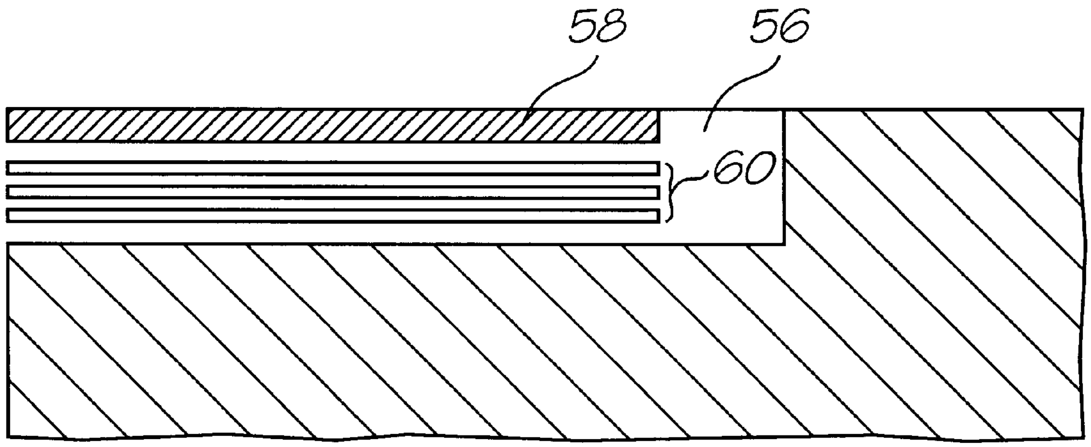
FIG. 8 is a cross sectional view of a portion of a thermoelastic actuator assembly according to a second embodiment of the present invention.

FIG. 8 depicts a thermoelastic actuator according to a further embodiment of the invention wherein the conductive pathway comprises a laminate 60 of three Aluminium layers and passive bend material. By alternating Aluminium layers with the passive bend material the effect of the heat conductive layers on the mechanical characteristics of the actuator may be minimized. Alternatively a single layer of another heat conductive material having a relatively low Young's Modulus might be used so as not to interfere with the mechanical characteristics of the actuator.

Figure 7:
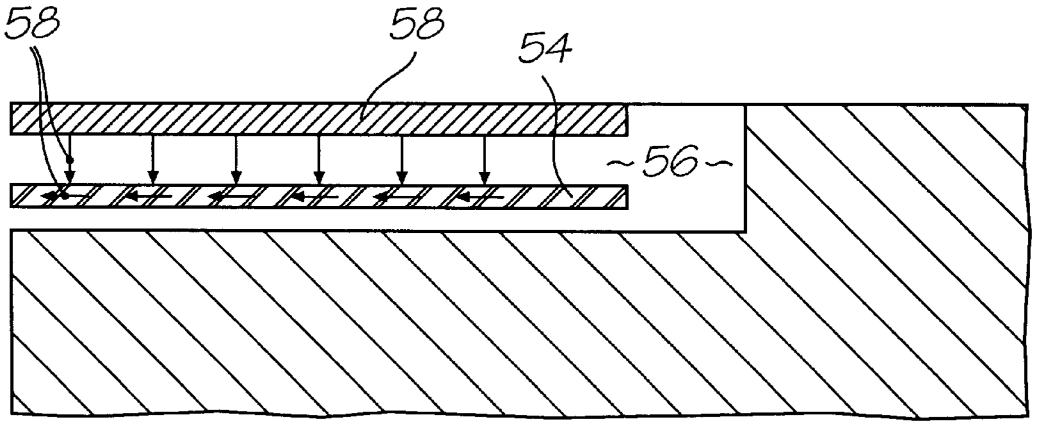
FIG. 7 is a cross sectional view of a portion of a thermoelastic actuator assembly according to a first embodiment of the present invention.
Figure 9:
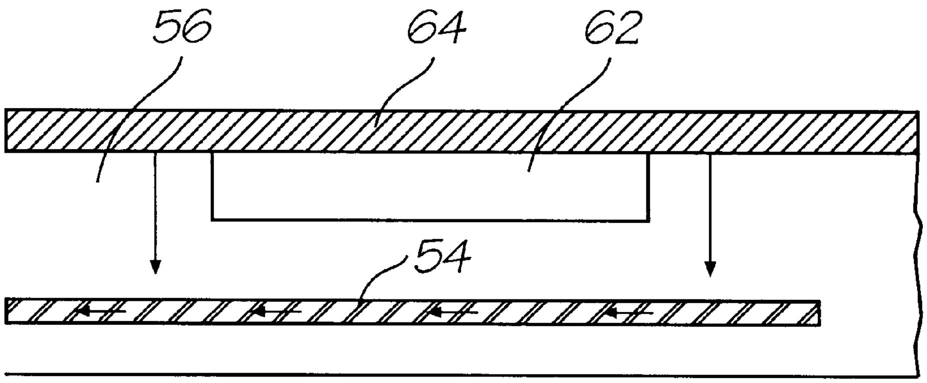
FIG. 9 is a cross sectional view of a portion of a thermoelastic actuator assembly according to a further embodiment of the present invention.

In the embodiments of FIGS. 7 and 8 the heating layer 58 is directly and continuously bonded to the passive bend layer 56. In so called "isolated" type thermoelastic actuators a heating element is not continuous with a passive substrate but is partly separated from it by an air space. In FIG. 9 there is shown a further embodiment of the invention applied to an isolated type actuator wherein a heating element 64 is partly separated from passive substrate 56 by an air space 62. Once again heat conductive layer 54 acts to conduct heat away towards the actuator support assembly (not shown).

The present invention provides an actuator with a tailored negative pulse characteristic. This has been done by providing a heat conduction means in the form of a layer of a good heat conductor such as Aluminium. By varying the heat conduction properties of the actuator the cool down time may be increased so that the actuator will return more quickly to its quiescent position. Accordingly the present invention also encompasses a method for designing actuators to have desired characteristics.

The method involves firstly determining a desired negative pressure pulse characteristic for the actuator. The pressure pulse characteristic will be due to the speed with which the actuator returns to its quiescent position. Typically the negative pressure pulse will be designed to cause necking of ink droplets for ink of a particular viscosity.

Once the pressure pulse characteristic has been decided upon a heat dissipation profile corresponding to the desired negative pressure pulse characteristic is determined. The determination may be made by means of a trial and error process if necessary or alternatively mathematical modeling techniques may be utilized. The thermoelastic actuator is then fabricated with a heat conduction layer arranged to realize said profile.

It may be simplest to form the actuator with a number of heat conductive layers in order to preserve the mechanical characteristics of the passive bend layer thereby reducing the number of variables involved in realizing the heat dissipation profile.

It will be realized that the actuator will find application in inkjet printer assemblies and ink jet printers.

Although the present invention has been described with reference to preferred embodiments, workers skilled in the art will recognize that changes may be made in form and detail without departing from the spirit and scope of the invention.

I claim:

1. A method of producing a thermoelastic actuator assembly having desired operating characteristics including the steps of:

determining a desired negative pressure pulse characteristic for the actuator;

determining a heat dissipation profile corresponding to the desired negative pressure pulse characteristic; and forming the thermoelastic actuator with a heat conduction means arranged to realize said profile.

2. A method according to claim 1, wherein the step of determining a desired negative pressure pulse characteristic includes a step of determining the physical qualities of a fluid to be used with the thermoelastic actuator.

3. A method according to claim 2, wherein the step of forming the thermoelastic actuator with a heat conduction means arranged to realize said profile includes forming one or more heat conductive layers in a passive bend layer of the actuator.

* * * * *